United States Patent [19]
Perlo et al.

[11] Patent Number: 6,059,428
[45] Date of Patent: May 9, 2000

[54] LIGHTING DEVICE, PARTICULARLY A MOTOR VEHICLE HEADLAMP, HAVING A MICRO-LENS STRUCTURE WITH A FLEXIBLE SUPPORT FOR ADJUSTING THE EMITTED LIGHT BEAM

[75] Inventors: Piero Perlo, Sommariva Bosco; Claudia Bigliati, Trino; Vito Lambertini, Giaveno; Piermario Repetto, Turin; Sabino Sinesi, Piossasco, all of Italy

[73] Assignee: C.R.F. Societa Consortile per Azioni, Orbassano, Italy

[21] Appl. No.: 09/014,653

[22] Filed: Jan. 28, 1998

[30] Foreign Application Priority Data

Feb. 19, 1997 [IT] Italy .................................. T097A0138

[51] Int. Cl.⁷ ...................................................... G02B 3/00
[52] U.S. Cl. ........................... 362/268; 362/512; 362/521; 362/169; 362/174

[58] Field of Search ..................................... 362/507–513, 362/520–524, 529–532, 109, 268, 277–279, 311, 319, 320, 331, 441–446, 449; 313/110; 359/642, 797

[56] References Cited

U.S. PATENT DOCUMENTS

| 3,807,834 | 4/1974 | Nagel ........................................ 350/167 |
| 5,594,526 | 1/1997 | Mori et al. ................................. 355/67 |

Primary Examiner—Sandra O'Shea
Assistant Examiner—Ismael Negron
Attorney, Agent, or Firm—Sughrue, Mion, Zinn, Macpeak & Seas, PLLC

[57] ABSTRACT

A lighting device includes a thin transparent plate in which a plurality of micro-lenses arranged in a matrix are integrated. A second thin transparent plate is supported so as to be movable relative to the first plate by means of at least one pair of flexures. A plurality of micro-lenses arranged in a matrix are also integrated in the second plate.

13 Claims, 7 Drawing Sheets

LIGHTING DEVICE, PARTICULARLY A MOTOR VEHICLE HEADLAMP, HAVING A MICRO-LENS STRUCTURE WITH A FLEXIBLE SUPPORT FOR ADJUSTING THE EMITTED LIGHT BEAM

BACKGROUND OF THE INVENTION

The present invention relates to a lighting device, for instance a motor-vehicle headlamp, or a portable signalling lamp, traffic light or display projector.

SUMMARY OF THE INVENTION

The object of the invention is that of providing a lighting device of the above indicated type which is able to vary the features of the emitted light beam, e.g. with respect of direction, and/or vergence and/or colour thereof, with extremely simple and low cost means.

In view of achieving this object, the invention provides a lighting device, characterized in that it comprises, in combination:

- a beam generator for generating a polychromatic light beam, having an optical axis,
- a first thin transparent plate located at a fixed position in front of the light beam generator, in which a plurality of micro-lenses arranged in a matrix are integrated,
- a second thin transparent plate located in front of said first plate and spaced therefrom, in which a plurality of micro-lenses are integrated, also arranged in a matrix, so that for each micro-lens of the first plate one or more micro-lenses are provided on the second plate, forming a sub-group of the matrix of the second plate,
- said second plate being movable at least along a transverse direction with respect to the optical axis of the light beam generator, with respect to the first plate, at least through a length sufficient for selectively bring one of the micro-lenses of a micro-lens sub-group of said second plate in a co-operating position relative to the corresponding micro-lens of said first place,
- said second plate being mounted on a support structure by means of at least one pair of flexures, in form of flat parallel leaves arranged orthogonally through the direction of movement of the second plate and each having two opposite edges one of which is secured to said supporting structure and the other edge carrying said second plate, and
- said device further comprising means for driving said movement of the second plate with respect to the first plate along said at least one direction.

In a preferred embodiment, said supporting structure on its turn is mounted on a base frame of the device by means of at least a further pair of flexures, constituted by two flat parallel leaves orthogonal to the optical axis of the light beam generator, so that said supporting structure on its turn is movable with respect to the base frame along a direction parallel to said optical axis.

BRIEF DESCRIPTION OF THE DRAWINGS

The invention will be now described with reference to the annexed drawings, given purely by way of non limiting example, in which.

DETAILED DESCRIPTION OF THE INVENTION

With to FIGS. 1–4, numeral 1 generally designates a portable lamp comprising a cylindric body 2 provided with a handle 3 and an inner light beam generator 4 for generating a polychromatic light beam, typically constituted by a light source of any type (not shown) and a reflective body 5. At the front of the reflective body 5 there is arranged a thin transparent plate 6 in which a micro-lens matrix is integrated, as shown in FIG. 1B. In front of the first plate 6, spaced apart therefrom, there is arranged a second thin transparent plate 7, in which a second micro-lens matrix similar to that shown in FIG. 1B is integrated. For instance, each micro-lens 120 of the matrices 100 integrated within plates 6, 7 has a rectangular contour having a dimension in the order of one millimeter.

In the example illustrated in FIGS. 1–4, the micro-lenses integrated within second plate 7 are coloured micro-filters, for example of three different colours, in order to generate a light beam at the output from the device which can be selectively of one of said three pre-determined colours. More in detail, the matrix integrated within plate 7 may be such that for each micro-lens of plate 6 three micro-filters are provided, which are aligned with each other along the vertical direction, with reference to FIG. 1. A small displacement along this direction of plate 7 with respect to plate 6 thus brings selectively the micro-filter of the selected colour at each micro-lens of plate 6. It is thus possible to obtain a change of colour in the light beam emitted by the device, without requiring any macroscopic movement and therefore with no particular complication of construction.

Figure 1A:
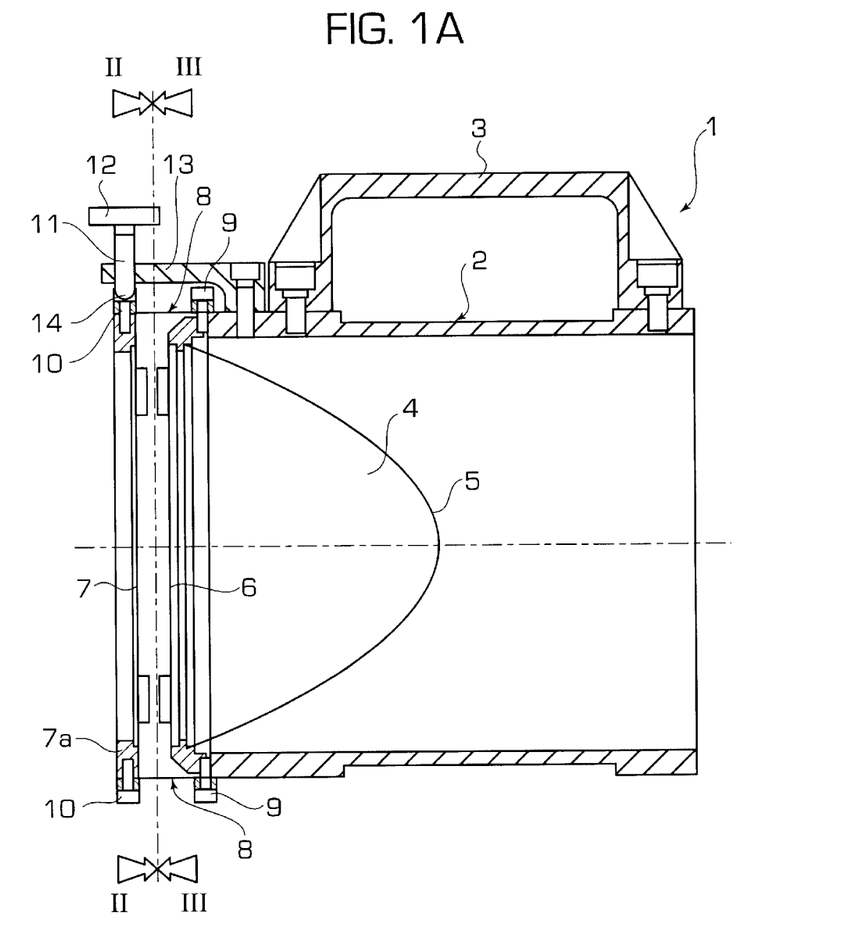
FIG. 1A is a cross-sectional view of a portable signalling lamp.
Figure 1B:
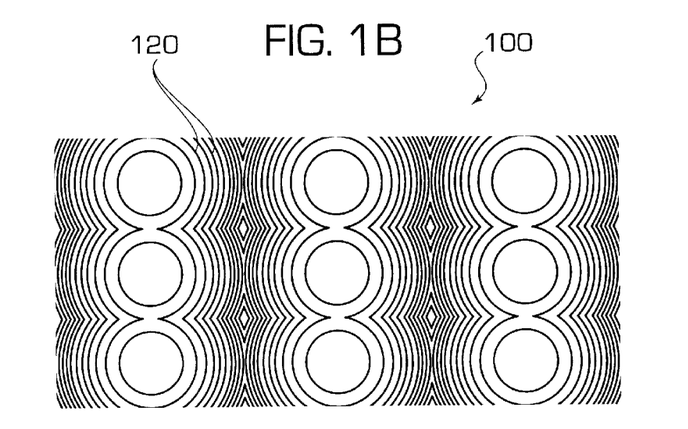
FIG. 1B is a partial view of a micro-lens matrix in a transparent plate.
Figure 2:
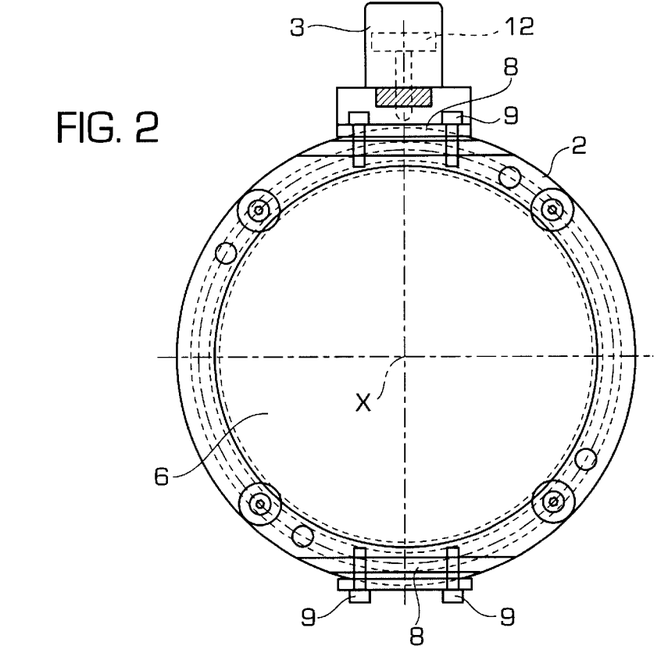
FIG. 2 is a cross-sectional view taken along arrows II—II of FIG. 1.
Figure 3:
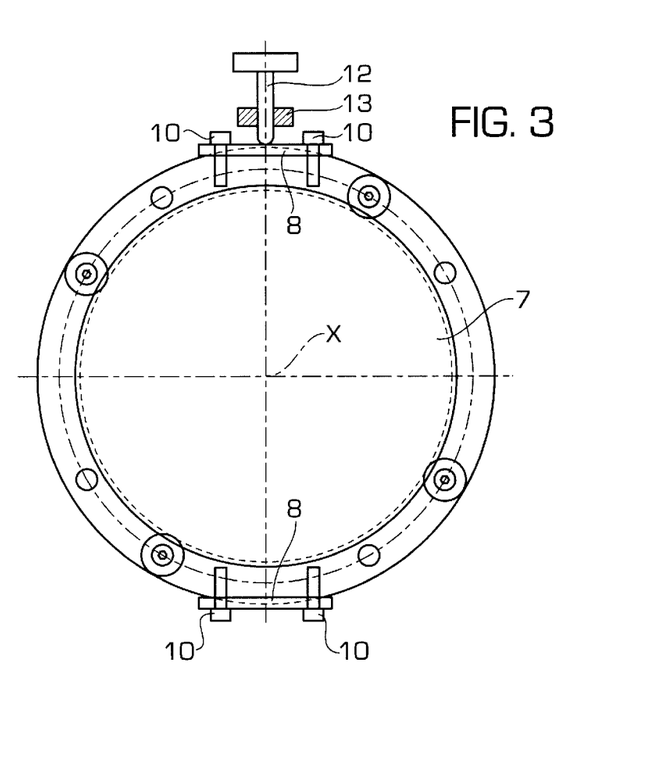
FIG. 3 is a cross-sectional view taken along arrows III—III of FIG. 1.
Figure 4:
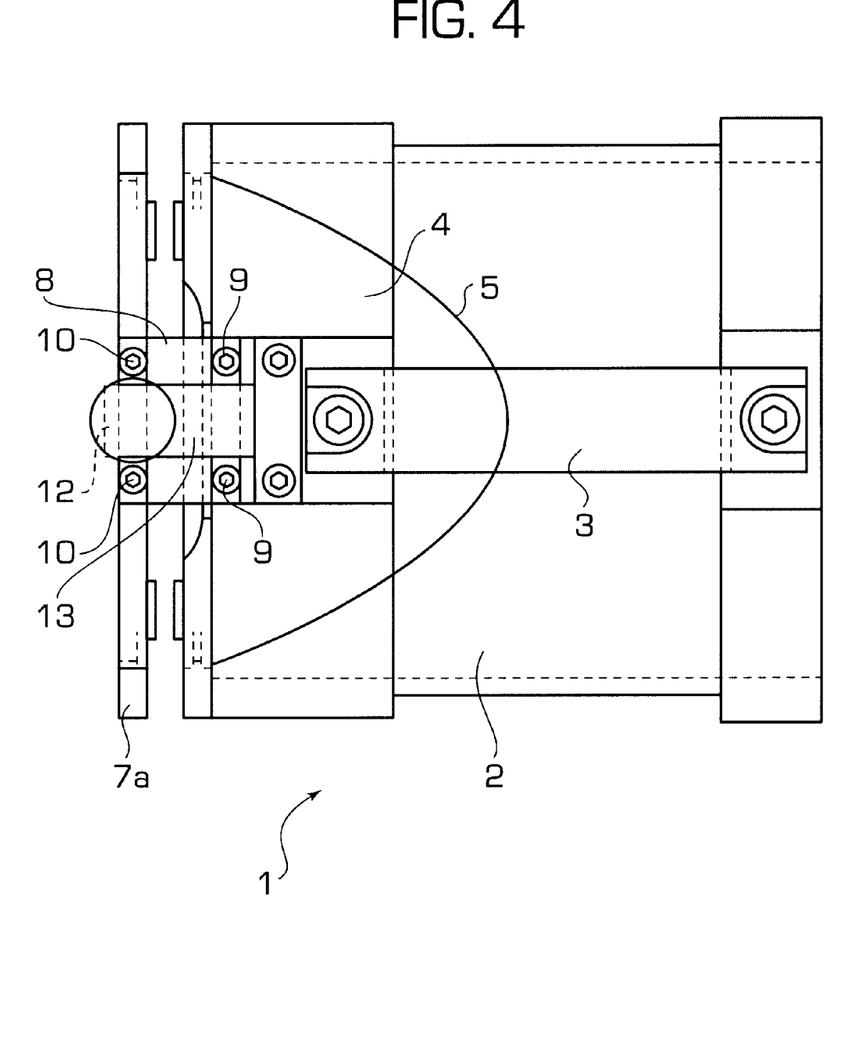
FIG. 4 is a plan view of the lamp of FIG. 1.

According to the invention, the above-mentioned movement of plate 7 is possible since this plate is supported by the body 2 of the device by means of a pair of flexures 8, in form of thin and parallel metal leaves, arranged in planes perpendicular to the above-mentioned vertical direction and each having opposite edges respectively secured to the body 2 and a frame 7a supporting the plate 7 by means of screws 9, 10. Because of this arrangement, the plate 7 is connected to plate 6 by a kind of parallelogram linkage, so that it is able to move vertically (with reference to FIG. 1) while remaining parallel to plate 6. This movement is driven by an adjustment screw 11, having a knurled head 12, which is screwed within a bracket 13 on its turn screwed to body 2 of the device. The screw 12 has a tip 14 in contact with the frame 7a of plate 7. By screwing the screw 12 within bracket 13 it is possible to obtain the displacement of plate 7, starting from the rest position shown in FIG. 1, in which the flexures 8 are undeformed, towards a series of consecutive lowered positions corresponding to consecutive deformations of flexures 8. Conversely, by unscrewing the screw 12 so as to cause a raising movement thereof with respect to bracket 13, a return of plate 7 is obtained towards the rest position, because of the back spring movement of flexures 13.

As already indicated above, it is possible for instance to provide three positions of plate 7 with respect to plate 6, which bring micro-filters of different colours of plate 7 in sequence to co-operate with each micro-lens of plate 6. Each of the three positions thus causes the emission at the output of a light beam of corresponding colour.

Figure 5:
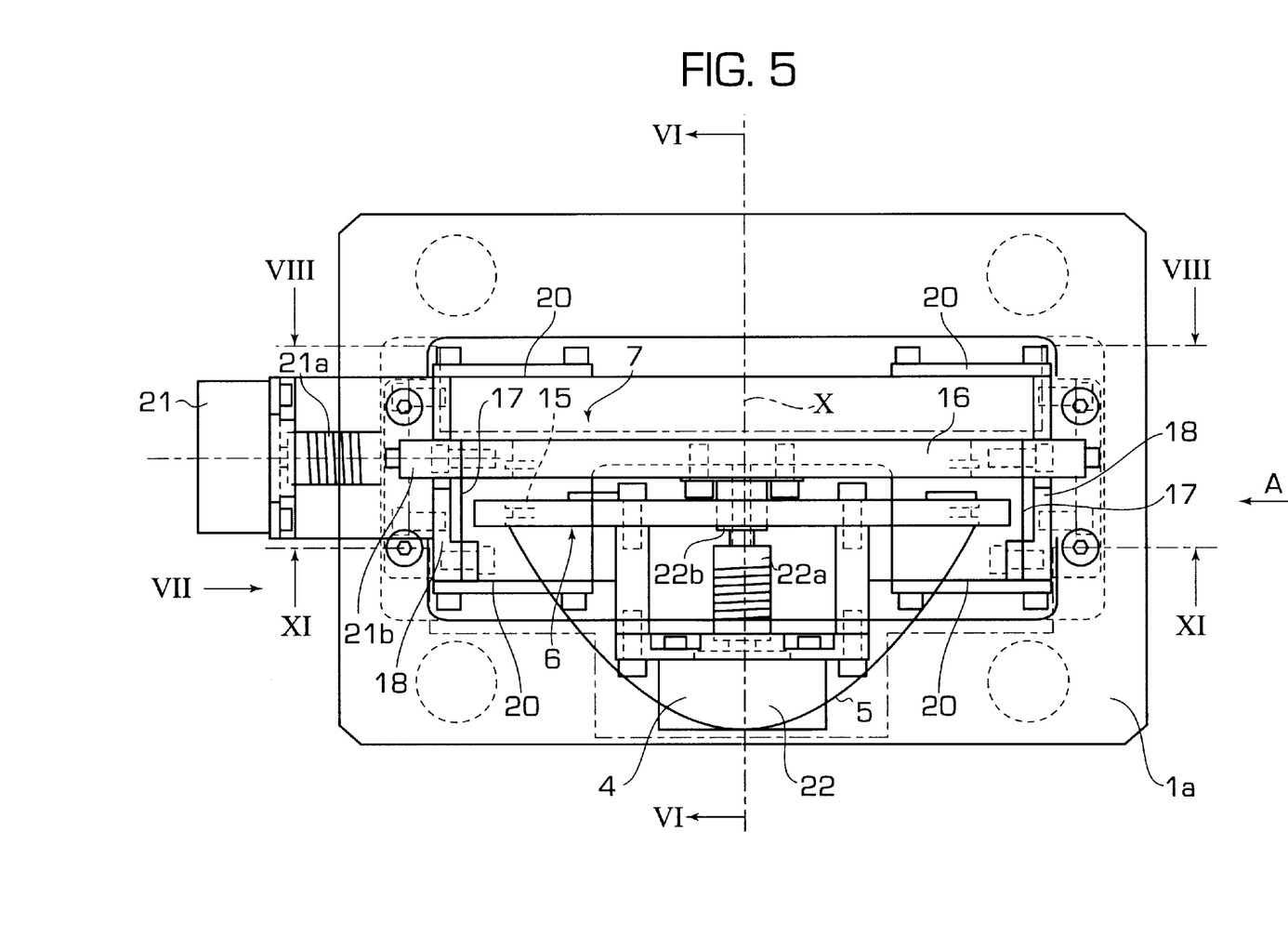
FIG. 5 is a plan view of a second embodiment of the device according to the invention, which can be used as a motor-vehicle headlamp.
Figure 6:
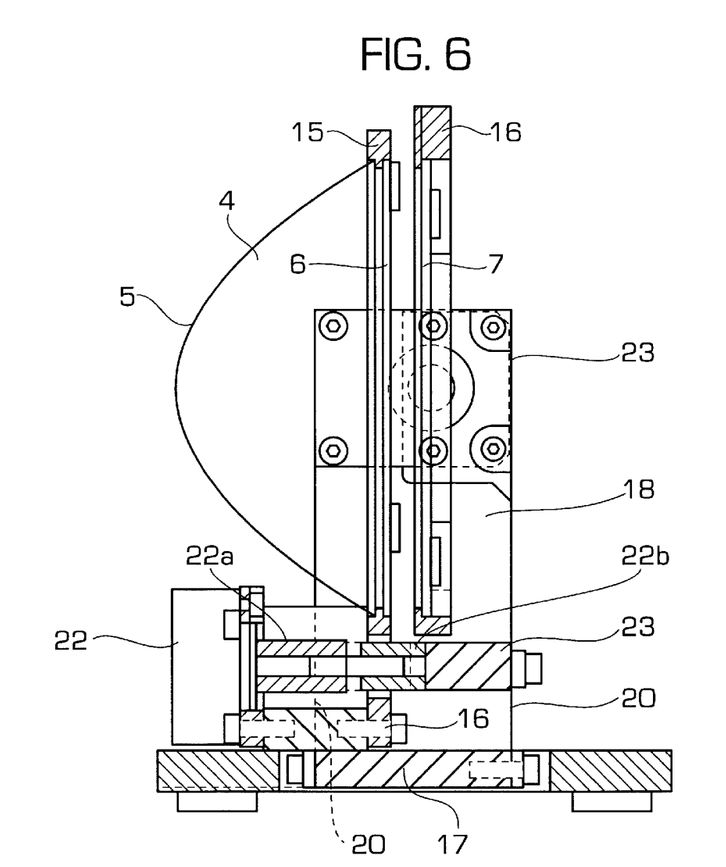
FIG. 6 is a side view of the headlamp of FIG. 5, along arrow VI of FIG. 5.
Figure 7:
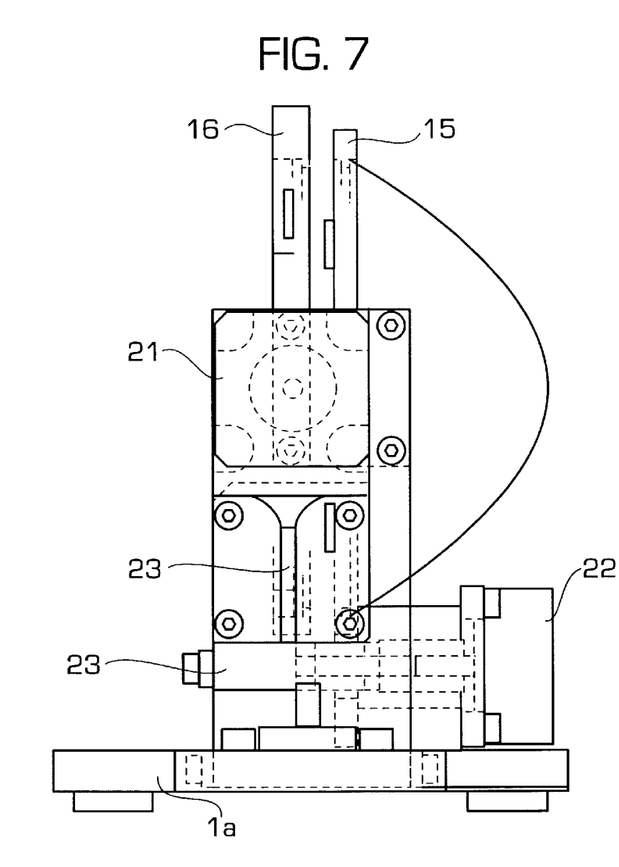
FIG. 7 is a side view of the headlamp of FIG. 5, along arrow VII of FIG. 5, and FIGS. 8, 9 are a front view and a rear view of the device of FIG. 5, along arrows VIII and IX of FIG. 5.
Figure 8:
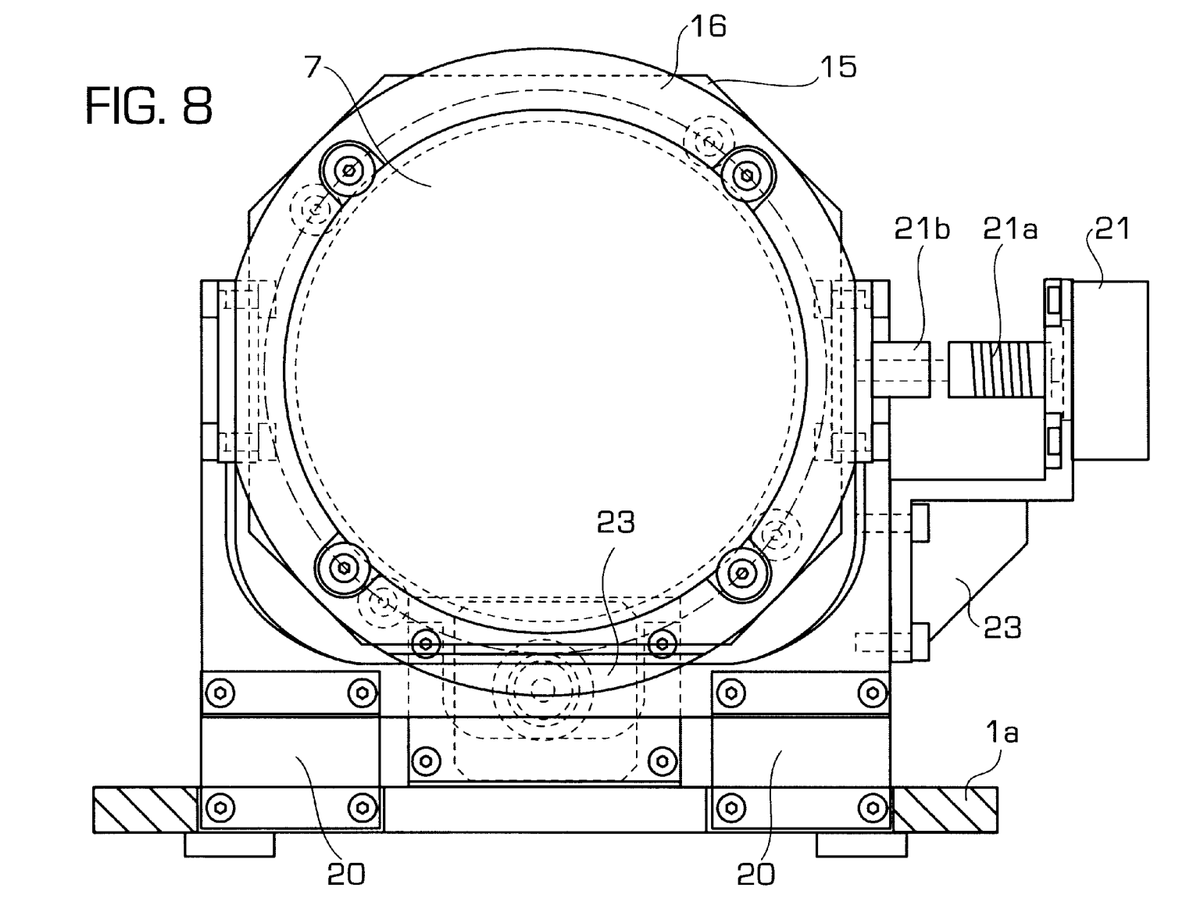
Figure 9:
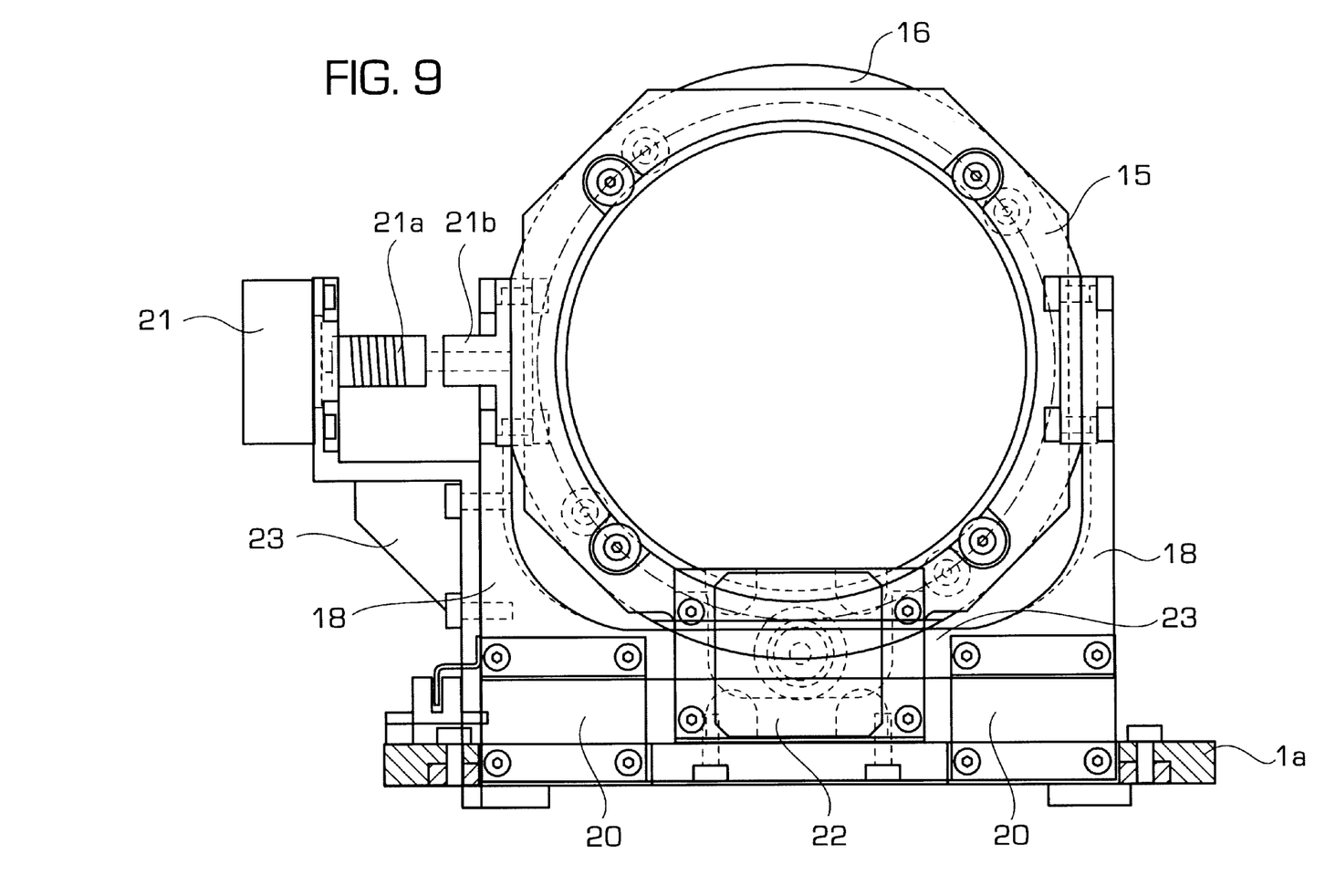

FIGS. 5–9 show a second embodiment of the device according to the invention, which to be used as a motor-vehicle headlamp. Also in this case, a generator 4 is provided for a polychromatic light beam, comprising a light source of any type and a reflective body 5. The latter carries a peripheral frame 15 at its mouth on which a first thin transparent plate 6 is secured, in which a matrix of micro-lenses is integrated. The peripheral frame 15 is secured at its base by means of screws 16 (FIG. 6) to a base frame 17. The second plate 7, also in this case, has an integrated micro-lenses matrix which is a multiple of matrix 6, so that for each micro-lens of plate 6 one or more micro-lenses are provided on plate 7. The plate 7 is carried by a peripheral frame 16 (FIGS. 8, 9) which is supported on both sides by a pair of flexures 17 (FIG. 5) in form of flat thin leaves arranged in vertical planes parallel to the optical axis X of the light beam generator 4. Each flexure 17 has two opposite edges respectively secured to the peripheral frame 16 (FIG. 5) and to a respective lateral upright 8 (FIGS. 8, 9). On their turn, the two lateral uprights 18 are connected to the base frame 17 by means of two pairs of flexures 20 each having opposite edges respectively screwed to the respective upright 18 and the base frame 17. Therefore, the plate 7 is movable in the direction indicated by arrows A in FIG. 5 as a result of a deflexion of flexures 17, by which plate 7 and its frame 16 are connected to the two supporting uprights 18. The plate 7 is further movable in the direction of the optical axis X, since the whole supporting structure constituted by the two uprights 18, and the frame 16 carrying plate 7, is movable in the direction X with respect to the base frame 17 due to a deflexion of flexures 20. The two above-mentioned movements are respectively controlled by an electric motor 21 and an electric motor 22. The electric motor 21 is carried by an auxiliary supporting structure 23 (FIG. 9) which is secured to one of the two uprights 18, whereas the electric motor is carried by the base frame 17 (FIG. 6). Each of these electric motors drives rotation of a screws (respectively 21*a*, 22*a*) which engages a nut (respectively 21*b*, 22*b*) respectively secured to frame 16 (FIG. 9) and to a structure 24 (FIG. 6) which connects the two uprights 18 transversally.

The electric motors 21, 22 can then be actuated in order to cause a displacement along direction A of FIG. 5 of the plate 7 with respect to plate 6, or a change in the distance between these plates. The latter change can be caused for instance in order to obtain a change in the beam vergence. The change along direction A can be instead caused in order to select the micro-lens of plate 7 which is in front of each micro-lens of plate 6, so as to obtain determined features of the beam, for example in order to obtain a horizontal angular movement of the axis of the light beam at the output which can be exploited while the motor-vehicle is performing a curve.

Naturally, in lieu of the adjustment along direction A, an adjustment along a vertical direction could be adopted, by absolutely similar means, in order to obtain determined changes of the features of the beam, for example for adjusting the height inclination of the light beam.

Naturally, the means controlling the movement of plate 7 with respect to plate 6 may be of any type, also different from what has been described above by way of example. For example it is possible to provide a cam actuator adapted to interact between two opposite surfaces in order to cause a change of the distance between these surface as a result of a rotation thereof. It is also possible to provide a sensor device for sensing the position of the plate, which can be constituted by a photo-diode or a magnetic-type sensor. The device can also be provided with a system for locking the movable plate in the selected position.

There are preferably provided electronic control means for said motor means, controlling the length and type of movement of said second plate according to a predetermined logic as a function of signals emitted by said means for sensing the position of the second plate, from said locking means and from means fro sensing the ambient conditions.

Naturally, while the principle of the invention remains the same, the details of construction and the embodiments may widely vary with respect to what has been described and illustrated purely by way of example, without departing from the scope of the present invention.

What is claimed is:

1. Lighting device, particularly motor-vehicle headlamp, comprising:

a light beam generator for generating a polychromatic light beam, having an optical axis, a first thin transparent plate, arranged in a fixed position in front of the light beam generator, in which a plurality of micro-lenses arranged in a matrix are integrated, a second thin transparent plate arranged in front of said first plate and spaced therefrom, in which a plurality of micro-lenses are integrated, which are also arranged in a matrix, so that for each micro-lens of the first plate there are one or more micro-lenses of the second plate, forming a sub-group of the matrix of the second plate, wherein said second plate is movable with respect to the first plate, at least along a direction transverse to the optical axis of the beam generator, and at least through a length sufficient for bringing selectively the micro-lenses of a micro-lens sub-group of the second plate to a position for co-operation with the corresponding micro-lens of the first plate, said second plate being mounted on a supporting structure by means of at least one pair of flexures, in form of flat parallel leaves, arranged orthogonally to the direction of movement of the second plate and each having two opposite edges one of which is secured to said supporting structure and the other edge carrying said second plate.

2. Device according to claim 1, wherein said supporting structure on its turn is mounted on a base frame by means of at least one further pair of flexures constituted by two flat parallel leaves, orthogonal to the optical axis, so as to be movable along a direction parallel to the optical axis.

3. Device according to claim 1, wherein the second plate is movable horizontally with respect to the first plate.

4. Device according to claim 1, wherein the second plate is movable vertically with respect to the first plate.

5. Device according to claim 1, wherein sensor means are provided for sensing the position of the second plate.

6. Device according to claim 5, wherein said sensor means are constituted by a photo-diode.

7. Device according to claim 5, wherein said sensor means are of a magnetic type.

8. Device according to claim 5, wherein means for locking said second plate at a selected position are provided.

9. Device according to claim 8, wherein means for controlling movement of the second plate are provided.

10. Device according to claim 9, wherein said movement control means include an adjustment screw adapted to push said second plate in one direction, causing a deformation of said flexures, the movement in the opposite direction of the second plate being caused by the back spring movement of said flexures.

11. Device according to claim 9, wherein said movement control means comprises motor means and a screw-end-nut system controlled by said motor means.

12. Device according to claim 10, wherein said control means comprises a rotatable cam element adapted to cause the movement of said second plate in one direction.

13. Device according to claim 11, wherein electronic control means for said motor means are provided, which control the length and type of movement of said second plate according to a pre-determined logic as a function of signals emitted from said means for sensing the position of the second plate, from said locking means and from means for sensing the ambient conditions.

* * * * *